(12) United States Patent
Halaka et al.

(10) Patent No.: US 7,814,788 B2
(45) Date of Patent: Oct. 19, 2010

(54) LIQUID LEVEL SENSOR

(75) Inventors: Folim G. Halaka, Lake Forest, IL (US);
Ronald E. Kukla, Wheeling, IL (US);
Scott G. Safar, Burlington, WI (US)

(73) Assignee: Abbott Laboratories, Inc., Abbott Park, IL (US)

( * ) Notice: Subject to any disclaimer, the term of this patent is extended or adjusted under 35 U.S.C. 154(b) by 325 days.

(21) Appl. No.: 11/584,404

(22) Filed: Oct. 20, 2006

(65) Prior Publication Data

US 2008/0092646 A1 Apr. 24, 2008

(51) Int. Cl.
*G01G 23/26* (2006.01)
(52) U.S. Cl. .................................. 73/304 C
(58) Field of Classification Search ............ 73/304 C, 73/301, 313; 324/425, 600; 338/38; 340/620
See application file for complete search history.

(56) References Cited

U.S. PATENT DOCUMENTS

| | | | |
|---|---|---|---|
| 3,635,094 A | 1/1972 | Oberli | |
| 4,326,851 A | 4/1982 | Bello et al. | |
| 4,736,638 A | 4/1988 | Okawa et al. | |
| 4,912,976 A | 4/1990 | Labriola, II | |
| 5,049,826 A | 9/1991 | Sasao | |
| 5,275,951 A | 1/1994 | Chow et al. | |
| 5,365,783 A | 11/1994 | Zweifel | |
| 5,627,522 A | 5/1997 | Walker et al. | |
| 5,639,426 A * | 6/1997 | Kerr et al. .................. 422/100 |
| 5,648,727 A | 7/1997 | Tyberg et al. | |
| 5,855,851 A | 1/1999 | Matsubara et al. | |
| 6,148,666 A | 11/2000 | Roesicke | |
| 6,270,726 B1 | 8/2001 | Tyberg et al. | |
| 2006/0005622 A1* | 1/2006 | Burdi et al. ................ 73/304 C |
| 2006/0042376 A1* | 3/2006 | Reusche et al. ............. 73/304 C |
| 2006/0196263 A1* | 9/2006 | Stahlmann et al. ......... 73/304 R |

FOREIGN PATENT DOCUMENTS

| | | |
|---|---|---|
| EP | 0 633 456 B1 | 1/1995 |
| WO | 2005/045635 A2 | 5/2005 |

OTHER PUBLICATIONS

Kirk Othmer Encyclopedia of Chemical Technology, Fourth Edition, vol. 15 (John Wiley & Sons, Inc.:1995) pp. 409-434.

* cited by examiner

*Primary Examiner*—Hezron Williams
*Assistant Examiner*—Alex Devito
(74) *Attorney, Agent, or Firm*—David L. Weinstein (57) ABSTRACT

An apparatus and method for determining the level of liquid in a container in an analytical instrument, typically an automated analytical instrument in a laboratory. The apparatus comprises:
(a) an electrically conductive support;
(b) an electrically conductive platform rising up from said electrically conductive support, said platform capable of supporting at least one container that is capable of containing a liquid, said platform having an area less than that of the electrically conductive support;
(c) an electrically conductive element, such as, for example, the electrically conductive tip of a probe, the distance between the electrically conductive platform and the electrically conductive element capable of being reduced or increased by relative movement between the electrically conductive element and the electrically conductive platform; and
(d) a capacitance sensor coupled to the electrically conductive element (c) and arranged to provide an electrical signal representing the capacitance.

9 Claims, 4 Drawing Sheets

LIQUID LEVEL SENSOR

BACKGROUND OF THE INVENTION

1. Field of the Invention

This invention relates to a device and method for measuring the level of liquid in a container. More particularly, the invention relates to a device and method for sensing and quantifying the level of liquid in a container in liquid handling equipment for medical devices.

2. Discussion of the Art

Liquid level sensors, particularly liquid level sensors that determine the level of liquid in a container by measurement of capacitance, are widely used to detect the heights of liquids (liquid levels) inside containers. Many automated analytical instruments utilize liquid level sensors. For example, liquid level sensors are used in conjunction with the m2000 systems commercially available from Abbott Molecular Diagnostics Division, Abbott Laboratories, Des Plaines, Ill., for sample preparation for polymerase chain reaction (alternatively referred to herein as "PCR"). Erroneous liquid level measurements may cause incorrect and invalid analytical results in assays, and, consequently, adversely affect the reliability of systems utilizing automated analytical instruments.

U.S. Pat. Nos. 3,635,094; 4,326,851; 4,736,638; 4,912,976; 5,049,826; 5,275,951; 5,365,783; 5,627,522; 5,639,426; 5,648,727; 5,885,8516, 148,666; 6,270,726; EP 0 633 456; and WO 2005/0456635 describe liquid level sensors that employ capacitance measurements to determine the level of a liquid in a container.

In liquid level sensors utilizing capacitance measurements, typically an electrically conductive tip of a probe approaches a container containing a liquid. An electrical signal, such as, for example, a signal that correlates with the impedance determined by the liquid level sensing apparatus, is measured. From well-known capacitance equations, it is known that capacitance values depend on the distance of the electrically conductive tip of the probe from the surface of the liquid. Also, because the dielectric constants of air and water (or aqueous solutions) are markedly different, the capacitance value undergoes a sudden change as the electrically conductive tip of the probe makes the transition from air to contact the surface of the liquid. Furthermore, after the electrically conductive tip of the probe enters the liquid, the capacitance varies as a function of the height of the liquid between the electrically conductive tip of the probe and the other electrode in the capacitance system. The other electrode in the system is usually the ground plane. See, for example, U.S. Pat. No. 5,648,727. The capacitance value increases as the distance separating the electrodes decreases.

In a conventional capacitor, two metallic plates are separated by a layer of insulating material. In liquid level measurements, the capacitor employed comprises the electrically conductive tip of the probe as one "plate" and the instrument ground as the second "plate".

Electrical capacitance (capacitance) refers to the ability to store an electrical charge. The classical representation of a capacitor involves two parallel plates separated by an air gap or an insulator. In such a configuration, the capacitance is defined as:

$$C = Q/V \quad (1)$$
$$= A \varepsilon_r \varepsilon_o V/d$$

where:
C represents capacitance
V represents voltage
Q represents charge
A represents overlapping surface area (effective area) of the electrical conductors
$\varepsilon_o$ represents permittivity of free space (constant)
$\varepsilon_r$ represents relative dielectric constant of the insulating material
d represents distance between the electrical conductors Of particular note is the dependence of the capacitance, as defined in Equation (1), on the spacing (represented by "d") and area (represented by "A") of the electrical conductors, the electrical characteristic of the gap insulating material (represented by the relative dielectric constant, $\varepsilon_r$), as capacitance increases as $\varepsilon_r$ increases. It is also important to note that "A" represents an "effective" area, representing the overlap of the two plates, for the overlapping area defines the electric field.

In many applications, the capacitor is connected to a radio frequency (RF) electrical signal. For sensing levels of liquids, the electrodes of the capacitor are usually connected to the feedback loop of an RF oscillator (frequencies in the range of ~30 KHz to ~1 MHz). In this case, the charging and discharging behavior of the capacitor, in addition to the factors enumerated above, will depend on the frequency of the RF signal. It is more practical to describe the impedance of the system, Z, which is a complex function defining the total "resistance" to current flow:

$$Z(f) = R + 1/(2 \pi j f C) \quad (2)$$

where:
R represents resistance
C represents capacitance
f represents measurement frequency (RF)
$\pi$ represents constant (3.14159 . . . )
$j = \sqrt{-1}$ or, $$Z(f) = R + 1/(k' f C) \quad (3)$$

where k' combines the constants in Equation (2), i.e., k'=2 $\pi$ j.

It should be noted that equation (2) for impedance also includes the resistance (R). The value of resistance is significant where, for example, the electrically conductive tip of a pipette (i.e., the electrically conductive tip of the probe) makes the transition from air to the surface of a liquid, leading to a marked change in (R), because most solutions are more electrically conductive than air. Methods of liquid level sensing based on RF impedance are commonly provided with specific circuitry that measures changes in capacitance resulting from changes in the level of liquid in a container. Such circuitry can have numerous variations. Representative examples of such circuitry is described, for example, in U.S. Pat. Nos. 3,635,094; 4,326,851; 4,736,638; 5,049,826; 5,275,951; 5,365,783; 5,627,522; 5,648,727; 6,148,666; 6,270,726; EP 0 633 456; and WO 2005/0456635, all of which are incorporated herein by reference to illustrate and describe circuitry suitable for use in measuring changes in capacitance by means of a liquid level sensor.

Measurements of liquid level in liquid handling systems by means of capacitance, such as for example, the m1000 and m2000sp instruments from Abbott Molecular Diagnostics (a division of Abbott Laboratories), Des Plaines, Ill., typically use the metallic surface of the deck of the instrument as one of the plates of the capacitor, the other plate of the capacitor being the electrically conductive tip of the probe. The electrically conductive tip of the probe acts as an electrode, and is connected to a RF source, while the deck of the analytical instrument acts as another electrode. In this configuration, errors in determining liquid level occur frequently. Measurement of the electrical signal representing capacitance varies with the height of the electrically conductive tip of the probe. However, measurements show that there is an excessive amount of noise in the electrical signal. Noise is indicated by the standard deviation in repeated measurements. It is believed that the noise occurs because of a poorly defined capacitor configuration when the large surface of the instrument (e.g., surface area greater than 5000 cm$^2$) is used as a capacitor plate. Additionally, such a configuration may allow interference from neighboring components on the deck of the instrument.

The prior art cited describe liquid level sensing, primarily emphasizing liquid level sensing by means of capacitance. It has been observed that in many instruments, the capacitors used for liquid level measurement are not constructed to reliably perform liquid level sensing. The poor construction can be attributed to unconventional components of the capacitor used for liquid level measurements, i.e., the electrically conductive tip of the probe and the electrically conductive deck of the instrument.

It would be desirable to provide methods to improve the reliability and accuracy of determining the level of liquid in a container in an automated instrument.

SUMMARY OF THE INVENTION

This invention utilizes the relationship between radio frequency capacitance and electrode configuration to improve determination of level of liquid in a container.

In one aspect, this invention provides an apparatus for determining the level of liquid in a container in an analytical instrument, typically an automated analytical instrument in a laboratory. The apparatus comprises:

(a) an electrically conductive support;
(b) an electrically conductive platform rising up from said electrically conductive support, said platform capable of supporting at least one container that is capable of containing a liquid, said platform having an area less than that of the electrically conductive support;
(c) an electrically conductive element, such as, for example, the electrically conductive tip of a probe, the distance between the electrically conductive platform and the electrically conductive element capable of being reduced or increased by relative movement between the electrically conductive element and the electrically conductive platform; and
(d) a capacitance sensor coupled to the electrically conductive element (c) and arranged to provide an electrical signal representing the capacitance.

In one embodiment, the analytical instrument has an electrically conductive support having a raised electrically conductive platform thereon, the raised platform functioning to elevate at least one container containing a liquid that requires the determination of the level thereof above the surface of the electrically conductive support. An electrical field generated by the deposition of, for example, positive charges on the electrically conductive element, e.g., the electrically conductive tip of a probe, forces free negative charges on the raised electrically conductive platform to mirror the charges on the electrically conductive element, e.g., the electrically conductive tip of the probe, according to the lines of field strength. The raised electrically conductive platform on the electrically conductive support of the analytical instrument generally functions as an electrical ground, thereby forming one of the capacitor's plates for measurements of level of liquid in a container. Because of the positioning of the electrically conductive platform, the electric field is focused onto the electrically conductive platform. The liquid level is determined when a container containing the liquid is placed on the platform. In one embodiment, the platform has a base and a plurality of projections rising upwardly from the base of the platform.

In another aspect, this invention provides a method for using the aforementioned apparatus. The method comprises the steps of:

(a) providing an apparatus comprising:
  (1) an electrically conductive support;
  (2) an electrically conductive platform rising up from said electrically conductive support, said platform capable of supporting at least one container that is capable of containing a liquid, said platform having an area less than that of the electrically conductive support;
  (3) an electrically conductive element, such as, for example, the electrically conductive tip of a probe, the distance between the electrically conductive platform and the electrically conductive element capable of being reduced or increased by relative movement between the electrically conductive element and the electrically conductive platform; and
  (4) a capacitance sensor coupled to the electrically conductive element (c) and arranged to provide an electrical signal representing the capacitance;
(b) placing at least one container containing a liquid onto the electrically conductive platform;
(c) moving the electrically conductive element relative to the at least one container; and
(d) measuring capacitance as a function of the distance between the electrically conductive element and the electrically conductive platform.

This invention provides the benefits of (a) accurate pipetting and dispensing of liquids; (b) robust sensing of the levels of liquids in containers; and (c) ease of fabricating electrically conductive platforms tailored for the containers for which liquid level sensing is to be performed.

BRIEF DESCRIPTION OF THE DRAWINGS

FIG. 1 is a side view in elevation schematically illustrating the deck of an analytical instrument upon which a container rests when the level of liquid therein is being determined. FIG. 1 also shows the electrically conductive tip of a probe and field lines. FIG. 1 is an illustration of the prior art.

FIG. 2 is a side view in elevation schematically illustrating the deck of an analytical instrument having a raised platform on upon which a container rests when the level of liquid therein is being determined. FIG. 2 also shows the electrically conductive tip of a probe and field lines. FIG. 2 is an illustration of the present invention.

DETAILED DESCRIPTION OF THE INVENTION

As used herein, the term "support" means that portion of an analytical instrument that supports a platform that holds at least one container that is capable of holding a liquid. In general, the support is a portion of the chassis of the analytical instrument. As used herein, the term "platform" means a floor or horizontal surface raised above the level of an adjacent area. In this context, the adjacent area is the support. As used herein, the term "base" means the bottom part of the platform. As used herein, the term "projection" means an upstanding element arising from a surface of the platform. As used herein, the term "electrically conductive" means capable of conducting an electric charge.

Figure 1:
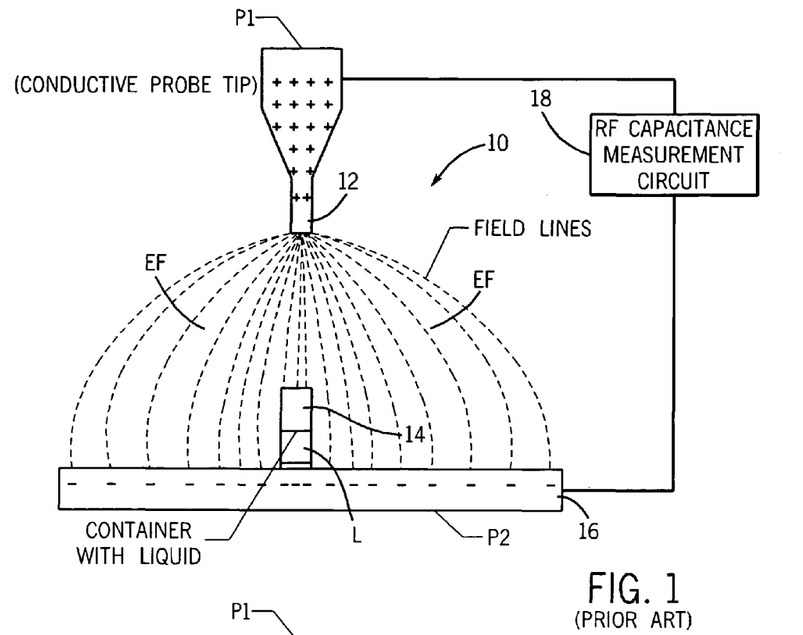

Referring now to FIG. 1, which depicts the prior art, a liquid level sensor 10 of the prior art comprises an electrically conductive tip 12 of a probe P1, which functions as a first capacitance plate, set above and in register with a container 14 that contains a liquid "L", the level of which is to be determined. FIG. 1 also shows an electrically conductive deck 16 of an analytical instrument (not shown). An electrical field "EF" generated by the deposition of, for example, positive charges on the electrically conductive tip 12 would force free negative charges on the electrically conductive deck 16 to "mirror" the charges on the electrically conductive tip 12, according to the field strength lines. In liquid handling systems, the electrically conductive deck 16 of the instrument is generally used as an electrical ground, and forms a second capacitance plate P2 for liquid level determination. An RF capacitance measurement circuit 18 connects the electrically conductive tip 12 to the electrically conductive deck 16. The current practice is to use the configuration depicted in FIG. 1.

Figure 2:
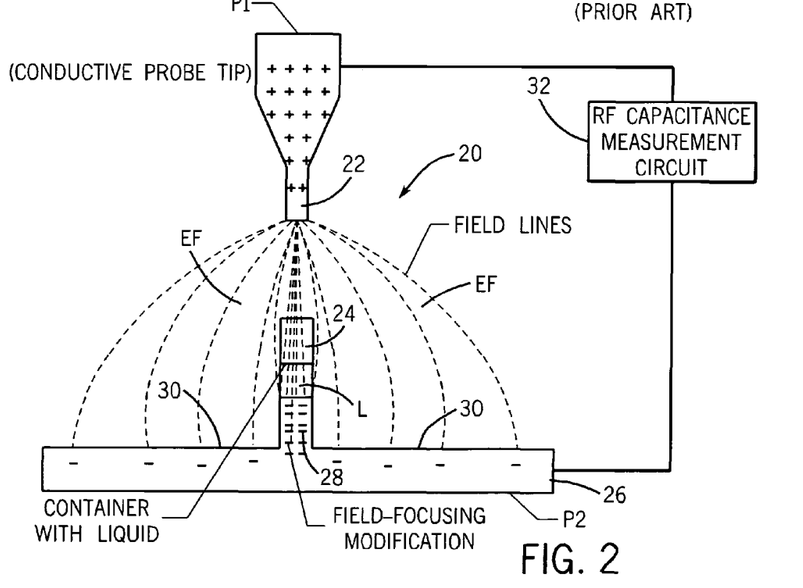

According to the present invention, as shown in FIG. 2, a liquid level sensor 20 of this invention comprises an electrically conductive tip 22 of a probe P1, which functions as a first capacitance plate, set above and in register with a container 24 that contains a liquid "L", the level of which is to be determined. An electrically conductive support 26 is constructed in such a manner that the electrical field "EF" is focused onto an area of interest 28, i.e., an electrically conductive platform, the area where the liquid level of the container 24 is to be sensed, normally defined by the placement of the container 24 containing the liquid "L". An RF capacitance measurement circuit 32 connects the electrically conductive tip 22 to the electrically conductive support 26. In FIG. 2, the electric field lines in the electric field, "EF", are appreciably more concentrated in the area in the vicinity of the container 24. The enhanced concentration of the electric field lines is accomplished by the modification of the surface 30 of the electrically conductive support 26 of the analytical instrument (not shown).

Probes P1 for measuring the level of liquid in a container and electrically conductive tips therefore are well-known to those of ordinary skill in the art. See, for example, U.S. Pat. Nos. 4,326,851; 5,049,826; 5,275,951; 5,365,783; 5,648,727; EP 0 633 456; and WO 2005/045635, incorporated herein by reference. Electrically conductive supports 16, 26 associated with analytical instruments are also well known to those of ordinary skill in the art. Such electrically conductive supports are typically the decks or chassis of analytical instruments. In order to measure the level of liquid in the container, a capacitance circuit is required. As stated previously, representative examples of such circuitry is described, for example, in U.S. Pat. Nos. 3,635,094; 4,326,851; 4,736,638; 4,912,976; 5,049, 826; 5,275,951; 5,365,783; 5,627,522; 5,639,426; 5,648,727; 5,885,8516,148,666; 6,270,726; EP 0 633 456; and WO 2005/0456635, all of which have been previously incorporated herein by reference to illustrate and described circuitry suitable for use in this invention.

The electrically conductive platform 28 performs the function of raising the containers holding liquids, the levels of which liquids are to be determined. The electrically conductive platform 28 is typically made of an electrically conductive base metal. However, other electrically conductive materials can be used in place of an electrically conductive base metal. The electrically conductive platform 28 should be of such a height so as to elevate the bases of the containers at least about one (1) mm, and preferably from about 10 to about 50 mm, above the surface of the electrically conductive support 26. The area of the electrically conductive platform 28 should be less than the area of the electrically conductive support 26, in order to focus the electric field. The area of the electrically conductive platform 28 should be sufficient to hold at least one container, and preferably a plurality of containers.

If an electrical signal derived from capacitance or impedance measurements is utilized to monitor the capacitance in the arrangement of FIG. 1, the variation of the signal would depend not only on the distance from the electrically conductive tip 12 to the electrically conductive deck 16, the composition of the container 14, and the liquid "L" contained therein, but also upon the geometry of the overlap area "A". In the present invention, as illustrated in FIG. 2, the overlap area "A" is clearly delineated, i.e., by the overlapping of the electrically conductive element 22 and the platform 28, with the result that the signal would be more robust to variations in distance, a desired feature for determination of level of liquid in a container.

Operation

In order to use the apparatus of this invention, at least one container containing a liquid is placed on the electrically conductive platform. The electrically conductive element, e.g., the electrically conductive tip of a probe, is lowered toward the surface of the liquid in the container in a stepwise manner. A circuit for measurement of electrical capacitance is connected to the electrodes, i.e., the electrically conductive tip 22 of the probe P1 and the electrically conductive support 26 (P2). An electrical output signal from the capacitance measurement circuit, typically voltage, is monitored, typically as a function of the distance of the electrically conductive tip 22 from the electrically conductive platform 28. As indicated previously, the capacitance increases as the distance between the electrically conductive tip 22 from the electrically conductive platform 28 decreases. In addition, a sharp change in the signal occurs when the electrically conductive tip 22 reaches the surface of the liquid in the container, because the transition from air to liquid results in a change of the dielectric constant. The sensing of the level of liquid in a container enables one to measure the level of liquid, or the quantity of liquid, from the known geometry of the container and the height (level) of the liquid in the container.

The examples herein show marked improvement in the sensing of liquid levels by the introduction of at least one electrically conductive platform 28 to focus the electric field "EF", thereby increasing the rate of change of the measured capacitance signal as a function of distance of the electrically conductive tip 22 to the electrically conductive platform 28 on the electrically conductive support 26.

The benefits of the present invention include, but are not limited to, the following: (a) accurate pipetting and dispensing of liquids; (b) robust sensing of liquid levels; and (c) ease of fabricating electrically conductive platforms tailored for the containers for which liquid level sensing is to be performed.

The following non-limiting example(s) further illustrate the invention described herein.

EXAMPLES

Example 1

Figure 3:
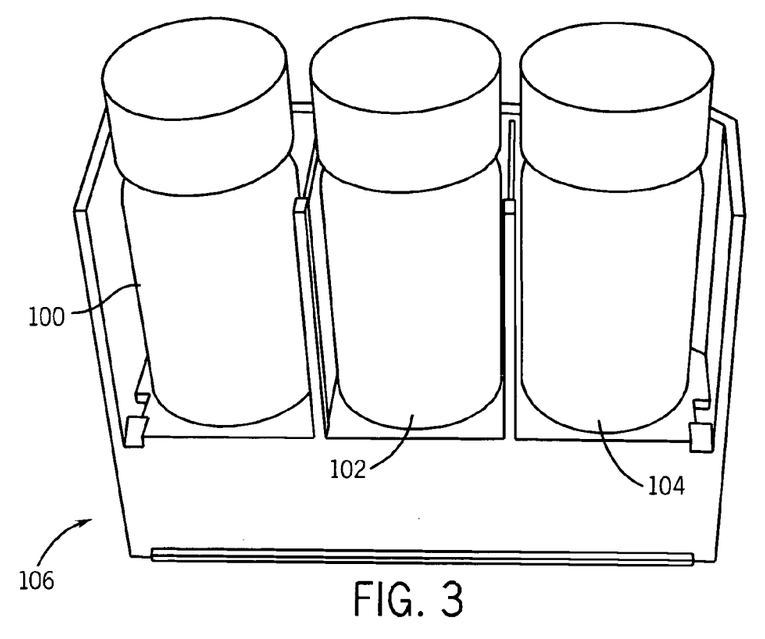
FIG. 3 is a perspective view of a package holding three containers suitable for holding liquids for use in an analytical instrument.

Apparatus and supplies suitable for carrying out this invention and comparing it to the prior art comprise the following components:

- (a) One (1) Tektronix Model No. TDS 754D Digital Oscilloscope, Serial Number—B01 0878
- (b) Two (2) Tektronix Active Scope probes, Model No. 6243
- (c) One (1) 3M 16 Pin, Headless, IC Test Clip
- (d) TECAN Freedom instrument (TECAN Schweiz AG, Switzerland), Abbott asset no. FRE No. 17, configured for m2000 analytical instrument
- (e) Abbott m2000sp original CT/NG Assay Reagent Pack
- (f) Abbott m2000sp modified CT/NG Assay Reagent Pack and platform with inverted conical projections
- (g) Personal computer running Microsoft Windows™ Software
- (h) TECAN Genesis™ Software (TECAN Schweiz AG, Switzerland) for moving pipette tips to specified location Measurements were taken by means of the electronics on board the Abbott Molecular Diagnostics m1000 instrument (manufactured by Tecan Schweiz AG, Switzerland). The instrument is provided with software and robotics to position the electrically conductive tip of a pipette to certain coordinates specified by the user. Liquid level sensing was carried out with small bottles containing reagents that are used for amplification for the Chlamydia Trachomatis (CT) and Neisseria Gonorrhea (NG) PCR assay, commercially available from Abbott Molecular Diagnostics (a division of Abbott Laboratories), Des Plaines, Ill. The bottles are arranged in a reagent pack, as shown in FIG. 3.

For capacitive measurements, the signal was monitored and recorded by means of an oscilloscope. The signal is a measure of the impedance sensed by the circuitry, and the amplitude of the signal represents a measure of robustness, or "goodness" of level sensing. In addition, error estimates were calculated using a standard deviation (sigma) formula. One of ordinary skill in the art can perform the measurements using available instrumentation, such as those available from Quantum Research Group, of Pittsburgh, Pa., USA.

The standard deviation was calculated from either 15 repeated measurements or 30 repeated measurements, by means of the MS EXCEL© spreadsheet. The quality of the signal was indicated by the process capability parameters: $C_p$, or $C_{pk}$ (see Schmidt and Launsby, *Understanding Industrial Designed Experiments*, Fourth Edition, Air Academy Press, Colorado Springs, Colo., USA (1994), incorporated herein by reference).

$C_p$ is an index of the process capability, with values above 1.0 generally considered acceptable. Larger $C_p$ values are considered indicative of a process having a higher quality. $C_{pk}$ is used when there is "one sided" distribution, i.e., the target value is either lower or higher than a specified limit. A negative $C_p$ or $C_{pk}$ value indicates a value outside the required limit specifications, which would normally be unacceptable. This can be seen from the definition:

$$C_p = \frac{\text{Specification width}}{\text{process width}} = \frac{USL - LSL}{6\sigma} \quad (4)$$

$$C_{pk} = \text{minimum of } \left(\frac{USL - \text{mean}}{3\sigma}\right) \text{ or } \left(\frac{\text{mean} - USL}{3\sigma}\right) \quad (5)$$

where σ represents standard deviation, USL represents the upper specification limit, and LSL represents the lower specification limit.

$C_p$ or $C_{pk}$ cannot assume a negative value, which would occur if the measurement values were outside the acceptable range. Optionally, the instrument system can have a control to reject values that are outside the acceptable range.

Figure 4:
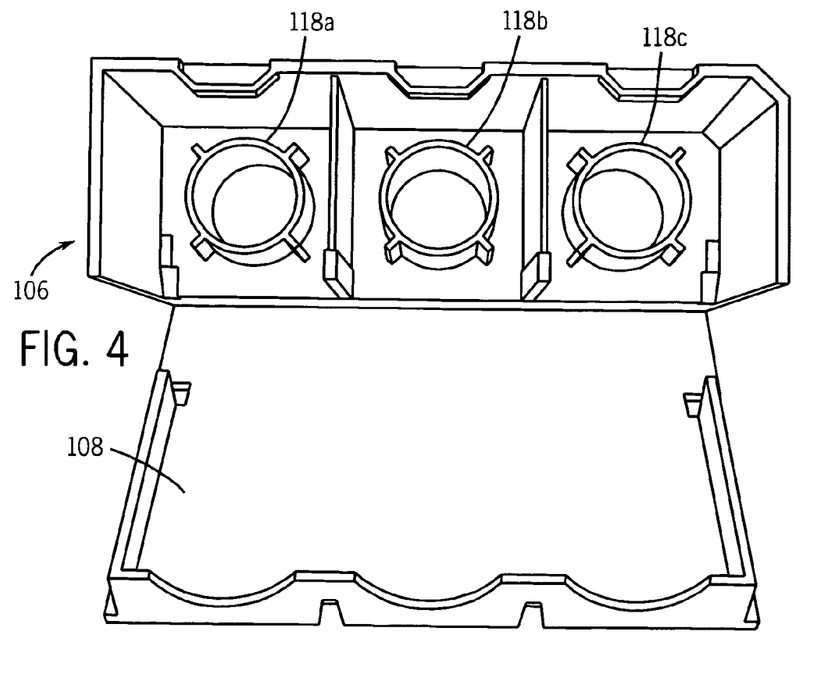
FIG. 4 is a perspective view showing a carrier upon which a plurality of containers can be mounted. The carrier can be used with an electrically conductive platform, more particularly, a platform having a base and a plurality of projections rising upwardly from the base of the platform. The openings in the carrier fit over and around the projections rising up from the base of the platform, which is mounted on the chassis of an analytical instrument.
Figure 5:
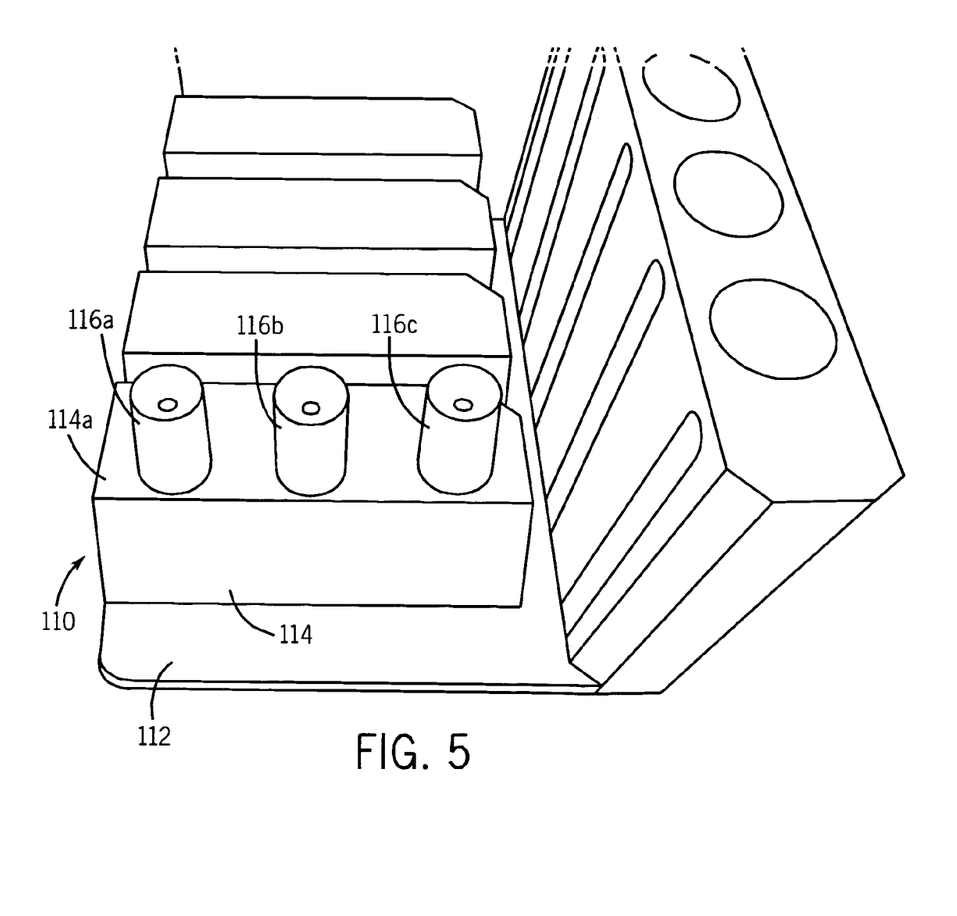
FIG. 5 is a perspective view showing a platform mounted on the chassis of an analytical instrument. The platform comprises a base having three projections for holding containers that contain liquids, the levels of which liquids can be determined by the apparatus and method of this invention.
Figure 6:
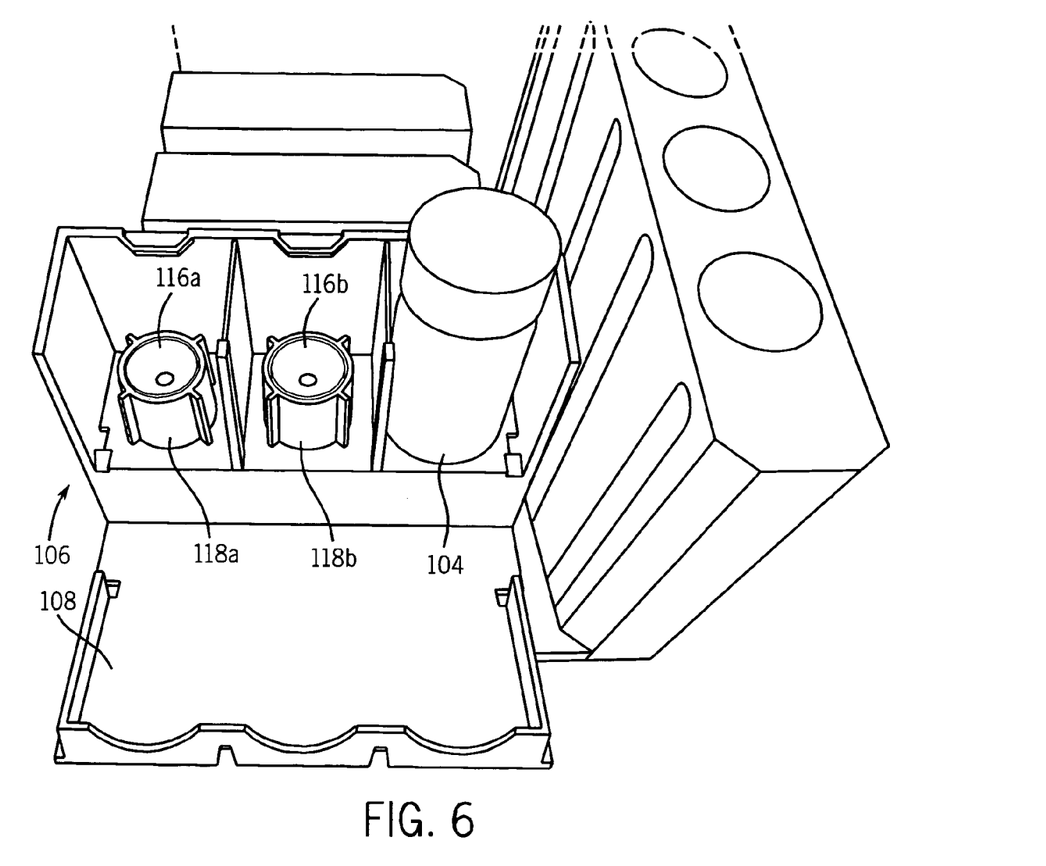
FIG. 6 is a perspective view showing the carrier for the package of containers fitted over and around the projections on the base of the platform. One reagent container is shown on a projection on the base of the platform.

Liquid level sensing was performed on the CT/NG assay reagent pack (the reagent pack). The reagent pack consists of three containers, each of which contains a different reagent required for the polymerase chain reaction (PCR). FIG. 3 is a perspective view that illustrates the reagent containers 100, 102, 104 in the reagent pack 106, with the front cover 108 of the reagent pack 106 removed for viewing the reagent containers 100, 102, 104 placed in the reagent pack 106. A perspective view of the reagent pack 106 is shown in FIG. 4. The reagent pack 106 is designed to be friction fitted on an electrically conductive platform 110 arising from the electrically conductive support 112 of the analytical instrument, as shown in FIG. 5. The electrically conductive platform 110 orients the reagent pack 106 for correct placement of the reagent containers 100, 102, and 104. FIG. 5 shows that the electrically conductive platform 110 comprises a base 114 having a top surface 114a and a plurality of cylindrically-shaped projections 116a, 116b, and 116c arising from the top surface 114a of the base 114. The top surface 114a of the base 114 preferably has a feature that facilitates proper orientation of the reagent pack 106. The cylindrically-shaped projections 116a, 116b, and 116c have the function of focusing the electric field on a reagent container 100, 102, or 104 as the electrically conductive tip 22 of the probe P1 is translated to a position to aspirate a reagent from a given container on the electrically conductive platform 110. FIG. 6 shows the placement of one reagent container 104 on the electrically conductive platform 110.

The reagent pack 106 is commercially available, with the reagent containers 100, 102, and 104 fitted onto raised rings 118a, 118b, and 118c of the reagent pack 106. The lower portion of each reagent container 100, 102, 104 is designed in such a manner to be fitted over a raised ring 118a, 118b, or 118c of the reagent pack 106. By mounting the reagent pack 106 that holds the reagent containers 100, 102, and 104 on the electrically conductive platform 110, the reagent containers of the reagent pack 106 are aligned with the cylindrically-shaped projections 116a, 116b, and 116c of the electrically conductive platform 110.

The reagent containers 100, 102, 104 in the reagent pack 106 hold variety of volumes of liquid; the container for the enzyme for use in the polymerase chain reaction has the lowest initial fluid volume, i.e., about 80 μL. The container in the center contains approximately 1 mL of oligonucleotide fluid.

An empty reagent container was tested to verify that a liquid level sensing error could be generated with this configuration, because the volume of fluid was so small. Liquid level sensing errors were generated when attempting to use an empty reagent container.

The liquid level sensing signal was measured against a bias level of 2.5 V, which is a pre-determined level for acceptable liquid level sensing. A threshold level is selected to indicate detection of the surface of the liquid in the container. A large difference between the threshold value and the measured signal would indicate more robust liquid level sensing, i.e., confidence that the surface of the liquid was sensed. A valid signal must pass a threshold voltage, set to ±1.7 V from the bias level. The threshold value was selected to reject "false liquid level sensing" errors. The signal may be larger or smaller than the bias value depending on whether the electrically conductive tip of a probe enters or leaves the liquid. For example, when the electrically conductive tip of the probe enters the liquid, the signal voltage value decreases, and the lower specification limit (LSL) is used in the $C_{pk}$ formula. Note that, in this case, the measured signal must be below 0.8 V (2.5 V−1.7 V). Similarly, when the probe leaves the liquid, the signal must exceed 4.2 V (2.5 V+1.7 V). In the examples below, the electrically conductive tip of the probe was entering the liquid, and the circuit would detect the liquid if the electrical output were less than 0.8 V. If the output were larger than 0.8 V, no liquid would be detected. In this case, detection of liquid is more reliable when the electrical output is much smaller than 0.8 V.

Liquid level measurements were conducted repeatedly, and the standard deviations and the $C_{pk}$ were calculated in accordance with Equation (5) by means of a Microsoft EXCEL© spreadsheet. TABLE 1 displays results for an arrangement of the type shown in FIG. 1, i.e., the prior art. TABLE 2 displays the results for an arrangement of this invention, as shown in FIGS. 2, 5, and 6.

The physical measurements in TABLE 1 and in TABLE 2 are in voltage units.

TABLE 1

Liquid level measurements of Containers of the Assay Reagent Pack without using the modification introduced by the present invention

| Type of liquid | Enzyme | Oligonucleotide fluid |
|---|---|---|
| Volume of liquid | 80 microliters | 1 mL |
| Sample number | | |
| 1 | 1.460 | 0.860 |
| 2 | 1.500 | 1.140 |
| 3 | 1.500 | 1.140 |
| 4 | 1.540 | 1.140 |
| 5 | 1.580 | 1.220 |
| 6 | 1.580 | 1.100 |
| 7 | 1.620 | 1.020 |
| 8 | 1.700 | 1.020 |
| 9 | 1.540 | 0.900 |
| 10 | 1.580 | 0.980 |
| 11 | 1.580 | 1.020 |
| 12 | 1.580 | 1.100 |
| 13 | 1.580 | 1.260 |
| 14 | 1.620 | 1.060 |
| 15 | 1.620 | 1.020 |
| Mean | 1.572 | 1.065 |
| Minimum | 1.460 | 0.860 |
| Maximum | 1.700 | 1.260 |
| Standard Deviation | 0.059 | 0.109 |
| $C_{pk}$ | 0 (−4.366) | 0 (−0.812) |

In TABLE 1, the capability of the measurement is minimal. In many cases, the $C_{pk}$ was less than zero, which means that the measured signal was outside the threshold value. As the capability cannot be negative, those cases are assigned zero values. It can be seen from the data in TABLE 1 that there is too much variability to determine whether the volume of liquid in the container is sufficient to carry out an assay.

TABLE 2

Liquid level measurements on the Assay Reagent Pack and using an embodiment of the present invention

| Type of liquid | Enzyme | Oligonucleotide fluid |
|---|---|---|
| Volume of liquid | 80 microliters | 1 mL |
| Sample number | | |
| 1 | −0.020 | −0.020 |
| 2 | −0.020 | −0.020 |
| 3 | −0.060 | −0.020 |
| 4 | −0.020 | −0.020 |
| 5 | −0.020 | −0.020 |
| 6 | −0.060 | −0.060 |
| 7 | −0.020 | −0.020 |
| 8 | −0.060 | −0.060 |
| 9 | −0.020 | −0.060 |
| 10 | −0.020 | −0.020 |
| 11 | −0.020 | −0.020 |
| 12 | −0.060 | −0.020 |
| 13 | −0.020 | −0.020 |
| 14 | −0.020 | −0.020 |
| 15 | −0.020 | −0.020 |
| 16 | −0.020 | −0.020 |
| 17 | −0.020 | −0.020 |
| 18 | −0.020 | −0.020 |
| 19 | −0.020 | −0.020 |
| 20 | −0.020 | −0.020 |
| 21 | −0.020 | −0.020 |
| 22 | −0.020 | −0.020 |
| 23 | −0.020 | −0.060 |
| 24 | −0.020 | −0.020 |
| 25 | −0.020 | −0.020 |
| 26 | −0.020 | −0.020 |
| 27 | −0.060 | −0.020 |
| 28 | −0.020 | −0.020 |
| 29 | −0.020 | −0.020 |
| 30 | −0.020 | −0.060 |
| Mean | −0.027 | −0.027 |
| Minimum | −0.060 | −0.060 |
| Maximum | −0.020 | −0.020 |
| Standard Deviation | 0.015 | 0.015 |
| $C_{pk}$ | 18.174 | 18.174 |

TABLE 2 shows the $C_{pk}$ according to the present invention. The values for both the 80 μL of Enzyme and 1 mL of oligonucleotide fluid yielded $C_{pk}$ values greater than 18.0, indicating a robust degree of liquid level determination.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An apparatus for determining the level of a liquid in a container, said apparatus comprising:
   (a) an electrically conductive support;
   (b) an electrically conductive platform supported by said electrically conductive support, said electrically conductive platform positioned above the level of the electrically conductive support, said electrically conductive platform for supporting at least one container for containing a liquid, said electrically conductive platform having an area less than that of the electrically conductive support;
   (c) an electrically conductive element, the distance between the electrically conductive platform and the electrically conductive element capable of being reduced or increased by relative movement between the electrically conductive element and the electrically conductive platform, said electrically conductive element overlapping said electrically conductive platform, wherein an RF capacitance measurement circuit connects the electrically conductive element to the electrically conductive support, wherein an electrical field is generated between the electrically conductive element and the electrically conductive platform; and (d) a capacitance sensor coupled to the electrically conductive element and arranged to provide an electrical signal representing the capacitance.

2. The apparatus of claim 1, wherein the electrically conductive platform has a surface for supporting at least one container.

3. The apparatus of claim 1, wherein the electrically conductive element comprises an electrically conductive tip attached to a probe.

4. The apparatus of claim 1, wherein the electrically conductive platform comprises an electrically conductive base and at least one electrically conductive projection for supporting at least one container.

5. The apparatus of claim 1, wherein the electrically conductive platform has an area that is sufficient to hold at least one container for containing a liquid.

6. The apparatus of claim 1, wherein said electrically conductive platform is positioned above said electrically conductive support by an amount such that the base of a container resting on said electrically conductive platform is elevated from the surface of said electrically conductive support from about one millimeter to about 50 millimeters.

7. The apparatus of claim 1, wherein said electrically conductive platform is positioned above said electrically conductive support by an amount such that the base of a container resting on said electrically conductive platform is elevated from the surface of said electrically conductive support from about 10 millimeters to about 50millimeters.

8. A method for the determination of the level of liquid in a container, the method comprising the steps of:
  (a) providing the apparatus of claim 1;
  (b) providing a quantity of liquid in the container therein;
  (c) allowing the electrically conductive element to be positioned outside the container;
  (d) moving the electrically conductive element toward the surface of liquid in the container in a stepwise manner;
  (e) measuring capacitance as a function of the position of the electrically conductive element;
  (f) comparing the capacitance measured in step (e) to a threshold value; and
  indicating the level of the liquid in the container.

9. The apparatus of claim 1, wherein the electrically conductive platform is integral with the electrically conductive support.

* * * * *